United States Patent [19]

Kuzuta

[11] Patent Number: 5,237,445
[45] Date of Patent: Aug. 17, 1993

[54] OPTICAL ISOLATOR

[75] Inventor: Nobuyuki Kuzuta, Atsugi, Japan

[73] Assignee: Shimadzu Corporation, Kyoto, Japan

[21] Appl. No.: 795,140

[22] Filed: Nov. 20, 1991

[30] Foreign Application Priority Data

Nov. 30, 1990 [JP] Japan ............................. 2-130718[U]
Nov. 30, 1990 [JP] Japan ............................. 2-130719[U]

[51] Int. Cl.$^5$ .......................... G02F 1/09; G02B 27/28
[52] U.S. Cl. ..................................... 359/281; 359/282; 359/484
[58] Field of Search ............... 359/281, 282, 283, 284, 359/484, 497; 385/11

[56] References Cited

U.S. PATENT DOCUMENTS

| 4,178,073 | 12/1979 | Uchida et al. | 359/484 |
| 4,548,478 | 10/1985 | Shirasaki | 359/484 |
| 4,712,880 | 12/1987 | Shirasaki | 359/484 |
| 5,033,830 | 7/1991 | Jameson | 359/484 |
| 5,052,786 | 10/1991 | Schulz | 359/484 |

FOREIGN PATENT DOCUMENTS

| 56-24314 | 3/1981 | Japan | 359/484 |
| 58-50512 | 3/1983 | Japan | 359/484 |
| 59-176721 | 10/1984 | Japan | 359/484 |
| 60-130934 | 7/1985 | Japan | 359/484 |
| 2-188715 | 7/1990 | Japan . | |

OTHER PUBLICATIONS

Shirasaki et al, "Compact Optical Isolator for Fibers Using Birefringent Wedges," *Applied Optics*, vol. 21, No. 23, Dec. 1, 1982, pp. 4296 to 4299.

Shirasaki et al, "A Compact Polarization-Independent Optical Isolator," *Transactions of the IECE of Japan*, vol. E64, No. 1, Jan. 1981.

"High-performance single-mode fiber polarization-independe isolators", *Optics Letters*, vol. 15, No. 8, Apr. 15, 1990.

*Primary Examiner*—Bruce Y. Arnold
*Assistant Examiner*—Martin Lerner
*Attorney, Agent, or Firm*—Armstrong, Westerman, Hattori, McLeland & Naughton

[57] ABSTRACT

An optical isolator having a combination of rutile plates or other birefringent crystals and Faraday elements. This optical isolator includes, arranged in the stated order along an optical axis, a first birefringent crystal; a first Faraday element for rotating a plane of polarization 45°; a second birefringent crystal having an optic axis rotated 45° with respect to the first birefringent crystal, and a thickness $\sqrt{2}$ times a thickness of the first birefringent crystal; a third birefringent crystal having an optic axis rotated 135° with respect to the first birefringent crystal, and a thickness $\sqrt{2}$ times the thickness of the first birefringent crystal; a second Faraday element for rotating the plane of polarization 45°; and a fourth birefringent crystal having an optic axis rotated 180° with respect to the first birefringent crystal, and a thickness equal to the thickness of the first birefringent crystal. Two polarized light components passing through this optical isolator have the same optical path length.

8 Claims, 5 Drawing Sheets

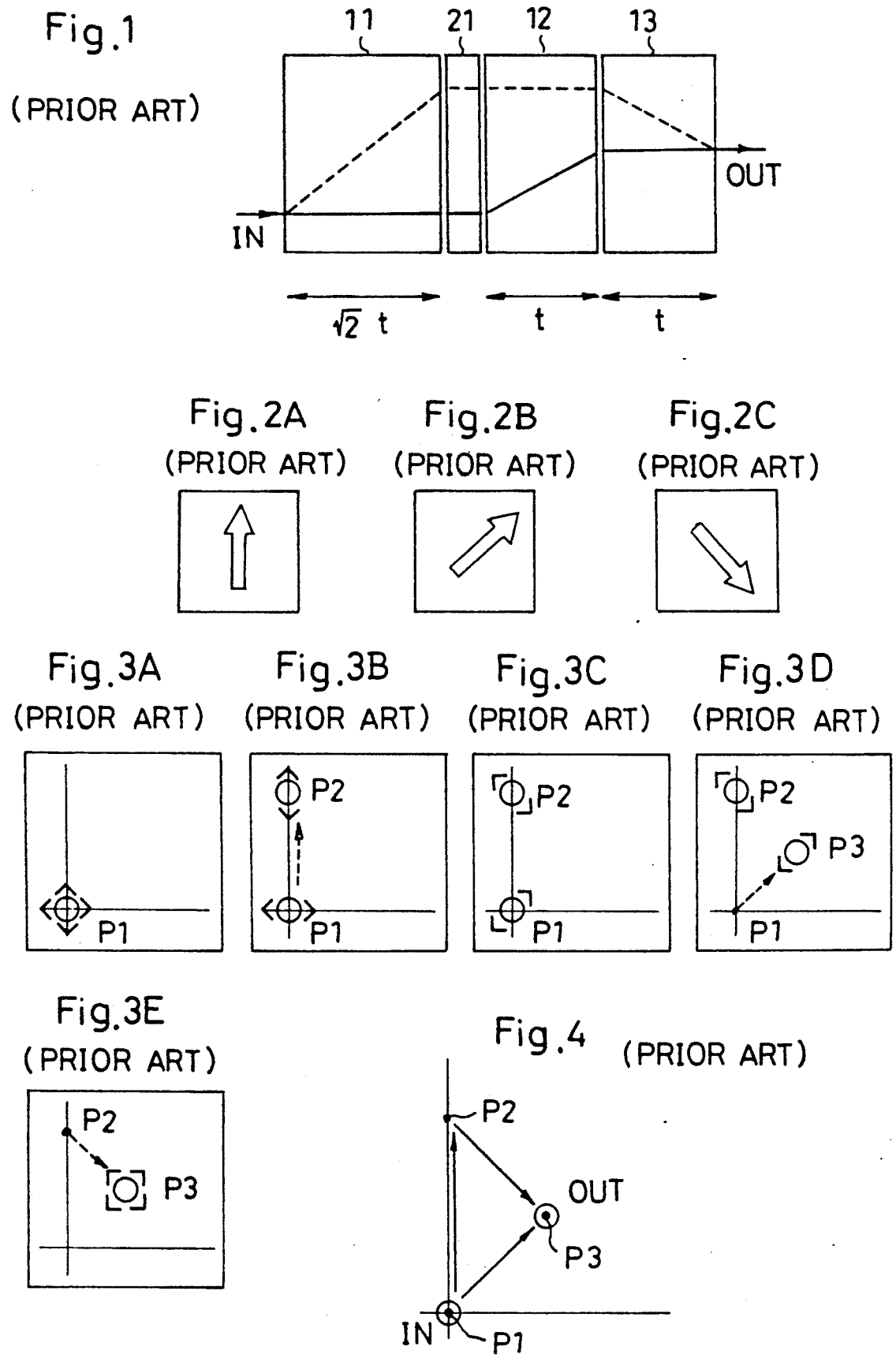

<Forward>

<Reverse>

<Forward>

<Reverse>

OPTICAL ISOLATOR

BACKGROUND OF THE INVENTION (1) Field of the Invention

This invention relates to optical isolators for use in optical fiber communication or in optical fiber amplifiers.

(2) Description of the Related Art

A known optical isolator of little polarization dependence is formed of birefringent crystals an Faraday elements. A construction of such an optical isolator will be described with reference to FIG. 1.

Generally, rutile (TiO$_2$) is used as the birefringent crystals. The optical isolator shown in FIG. 1 includes a rutile plate 11, a Faraday element 21, a rutile plate 12 and a rutile plate 13 arranged in the stated order from a light incident end. The rutile plate 11 has a thickness $\sqrt{2}t$, while the rutile plates 12 and 13 have a thickness t. The rutile plates 11, 12 and 13 have optic axes (C axes) oriented as shown in FIGS. 2A, 2B and 2C when seen from the light incident end, respectively. That is, the rutile plate 12 has an optic axis extending in a direction rotated 45° clockwise from the optic axis of the rutile plate 11. The rutile plate 13 has an optic axis extending in a direction rotated 135° clockwise from the optic axis of the rutile plate 11.

Assume that light enters the first rutile plate 11 at a position P1 shown in FIG. 3A. A component of the incident light having a vertical plane of polarization is refracted as an extraordinary light component, while a component having a horizontal plane of polarization travels straight through as an ordinary light component without being refracted. As a result, the two components of the light entering at position P1 exit at separate positions P1 and P2 on an exit end surface as shown in FIG. 3B. The distance between positions P1 and P2 is proportional to the thickness $\sqrt{2}t$ of the rutile plate 11.

The two polarized light components exiting separately have the respective planes of polarization rotated 45° in the Faraday element 21. Since the positional relationship between the two light components does not change, the two light components entering the rutile plate 12 have planes of polarization and incident positions as shown in FIG. 3C. Of the light components entering the rutile plate 12, the component entering at position P1 is refracted as an extraordinary light component and exits at position P3 as shown in FIG. 3D. The component entering at position P2 is an ordinary light component which passes straight through without being refracted. Position P3 is located 45° upward and rightward from position P1, and the distance therebetween is proportional to the thickness t of the rutile plate 12.

The two light components exiting the rutile plate 12 enters the rutile plate 13. Of the light components entering the rutile plate 13, the component entering at position P2 is refracted as an extraordinary light component and exits at position P3 as shown in FIG. 3E.

Position P3 is located 45° rightward and downward from position P2, and the distance therebetween is proportional to the thickness t of the rutile plate 13. The component entering at position P3 is an ordinary light component which passes straight through the rutile plate 13 without being refracted, and exits at position P3. Consequently, the two polarized light components coincide at exit position P3. FIG. 4 shows the positional relationship between the polarized components of the incident light, and sequence of variations occurring in the relationship until exit from the optical isolator.

Conventionally, the above optical isolator is used in series connection with another one-stage type optical isolator as shown in FIG. 1, in order to increase a loss in the reverse direction.

Aside from the foregoing optical isolator, a two-stage type optical isolator having a relatively simple construction has been proposed by Chang et al (Kok Wai Chang & Wayne V. Sorin, "High-performance single-mode fiber polarization-independent isolators", Opt. Lett. Vol. 15, No. 8, pages 449-451, 1990). This optical isolator will be described with reference to FIG. 5.

This optical isolator includes a rutile plate 14, a Faraday element 22, a rutile plate 15, a Faraday element 23 and a rutile plate 16 arranged in the stated order from a light incident end. The rutile plates 14 and 16 have a thickness t, while the rutile plate 15 has a thickness $\sqrt{2}t$. The rutile plates 14, 15 and 16 have optic axes oriented as shown in FIGS. 6A, 6B and 6C when seen from the light incident end, respectively. That is, the rutile plate 15 has an optic axis extending in a direction rotated 45° clockwise from the optic axis of the rutile plate 14. The rutile plate 16 has an optic axis extending in a direction rotated 90° clockwise from the optic axis of the rutile plate 14.

Assume that light enters the first rutile plate 14 at a position P1 shown in FIG. 7A. A component of the incident light having a vertical plane of polarization is refracted as an extraordinary light component, while a component having a horizontal plane of polarization travels straight through as an ordinary light component without being refracted. As a result, the two components of the light entering at position P1 exit at separate positions P1 and P2 on an exit end surface as shown in FIG. 7B. The distance between positions P1 and P2 is proportional to the thickness t of the rutile plate 14.

The two polarized light components exiting separately have the respective planes of polarization rotated 45° in the Faraday element 22. Since the positional relationship between the two light components does not change, the two light components entering the rutile plate 15 have planes of polarization and incident positions as shown in FIG. 7C. Of the light components entering the rutile plate 15, the component entering at position P1 is refracted as an extraordinary light component and exits at position P3 as shown in FIG. 7D. The component entering at position P2 is an ordinary light component which passes straight through without being refracted. Position P3 is located 45° upward and rightward from position P1, and the distance therebetween is proportional to the thickness $\sqrt{2}t$ of the rutile plate 15.

The two polarized light components exiting the rutile plate 15 have the respective planes of polarization rotated 45° in the Faraday element 23. Since, as noted above, the positional relationship between the two light components does not change, the two light components entering the rutile plate 16 have planes of polarization and incident positions as shown in FIG. 7E.

Of the light components entering the rutile plate 16 the component entering at position P2 is refracted as an extraordinary light component and exits at position P3 as shown in FIG. 7F. Position P3 is located rightward from position P2, and the distance therebetween is proportional to the thickness t of the rutile plate 16. The component entering at position P3 is an ordinary light component which passes straight through the rutile plate 16 without being refracted, and exits at position P3. Consequently, the two polarized light components coincide at exit position P3. FIG. 8 shows the positional relationship between the polarized components of the incident light, and sequence of variations occurring in the relationship until exit from the optical isolator.

The conventional optical isolators described above have the following disadvantages.

The optical isolator of FIG. 1 has the disadvantage that the two polarized light components travel through different optical path lengths from entry to the isolator to exit therefrom as shown in FIG. 4. This presents no problem if incident light is in the form of parallel rays. However, convergent or divergent light would form different focal points as a result of the different optical path lengths, which increases a coupling loss between the optical isolator and an exit side optical fiber. Further, this optical isolator is connected in series with another isolator of the same type, which results in a complicated construction with an increased number of optical elements constituting the optical isolators.

The optical isolator of FIG. 5 has a relatively simple construction. However, this isolator also has the disadvantage of providing different optical path lengths for the two polarized light components as shown in FIG. 8.

SUMMARY OF THE INVENTION

This invention has been made having regard to the state of the art noted above, and its object is to provide an improved optical isolator in which the two separate polarized light components travel through the same optical path length, so that no inconvenience occurs with convergent or divergent light.

The above object is fulfilled, according to this invention, by an optical isolator having a combination of birefringent crystals and Faraday elements, the optical isolator comprising, arranged along an optical axis:

a first birefringent crystal;

a first Faraday element for rotating a plane of polarization 45°;

a second birefringent crystal having an optic axis rotated 45° with respect to the first birefringent crystal, and a thickness $\sqrt{2}$ times a thickness of the first birefringent crystal;

a third birefringent crystal having an optic axis rotated 135° with respect to the first birefringent crystal, and a thickness $\sqrt{2}$ times the thickness of the first birefringent crystal;

a second Faraday element for rotating the plane of polarization 45°; and a fourth birefringent crystal having an optic axis rotated 180° with respect to the first birefringent crystal, and a thickness equal to the thickness of the first birefringent crystal.

According to this invention, the first and second birefringent crystals and the first Faraday element interposed therebetween constitute a first-stage isolator, while the third and fourth birefringent crystals and the second Faraday element interposed therebetween constitute a second-stage isolator. The first-stage isolator and second-stage isolator provide passages of light in a conversed relationship, whereby different polarized light components travel through the same optical path length.

In a further aspect of this invention, there is provided an optical isolator having a combination of birefringent crystals and Faraday elements, the optical isolator comprising, arranged along an optical axis:

a first birefringent crystal;

a first Faraday element for rotating a plane of polarization 45°;

a second birefringent crystal having an optic axis rotated 45° with respect to the first birefringent crystal, and a thickness $(1+\sqrt{2})$ times a thickness of the first birefringent crystal;

a second Faraday element for rotating the plane of polarization 45°;

a third birefringent crystal having an optic axis rotated 90° with respect to the first birefringent crystal, and a thickness $(1+\sqrt{2})$ times the thickness of the first birefringent crystal;

a third Faraday element for rotating the plane of polarization 45°; and a fourth birefringent crystal having an optic axis rotated 135° with respect to the first birefringent crystal, and a thickness equal to the thickness of the first birefringent crystal.

In this construction, the first and second birefringent crystals and the first Faraday element interposed therebetween constitute a first-stage isolator, the second and third birefringent crystals and the second Faraday element interposed therebetween constitute a second-stage isolator, and the third and fourth birefringent crystals and the third Faraday element interposed therebetween constitute a third-stage isolator. The birefringent crystals are paired in a thickness ratio of $1:(1+\sqrt{2})$ to provide the same optical path length for different polarized light components.

According to this invention, as described above, optical isolators may be constructed relatively easily for providing an equal optical path length for two separated light components to travel to the exit end. This construction is free from displaced focal points resulting from convergent or divergent light, thereby diminishing a loss occurring where the optical isolator is coupled to an optical fiber.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 1 is a schematic side view of a first example of conventional optical isolators, FIGS. 2A through 2C are views showing orientations of optic axes of rutile plates in the first example, respectively, FIGS. 3A through 3E are schematic views showing planes of polarization of and positional relations between polarized light components seen in a forward direction through the first example, FIG. 4 is a view showing the positional relations between the light components, and sequence of variations thereof occurring in the forward direction through the first example.

DETAILED DESCRIPTION OF THE PREFERRED EMBODIMENTS

Preferred embodiments of this invention will be described in detail hereinafter with reference to the drawings.

First Embodiment

Figure 5:
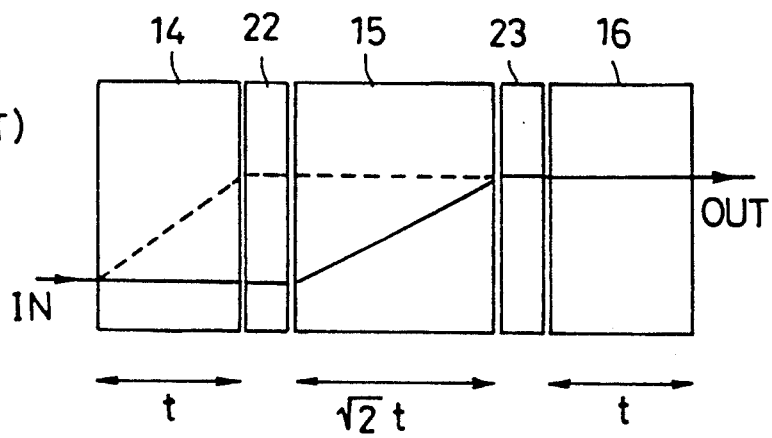
FIG. 5 is a schematic side view of a second example of conventional optical isolators.
Figure 6A:
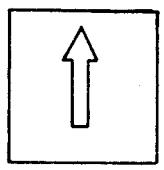
FIGS. 6A through 6C are views showing orientations of optic axes of rutile plates in the second example, respectively.
Figure 6B:
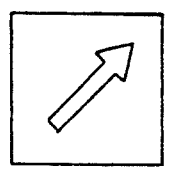
Figure 6C:
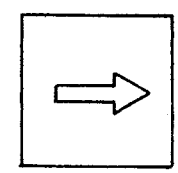
Figure 7A:
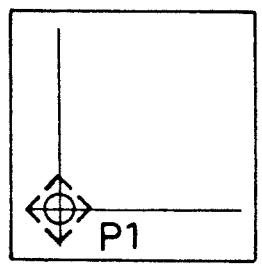
FIGS. 7A through 7F are schematic views showing planes of polarization of and positional relations between polarized light components seen in a forward direction through the second example.
Figure 7B:
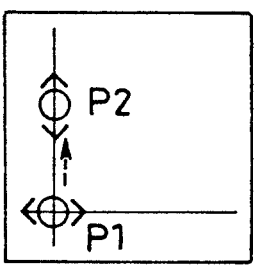
Figure 7C:
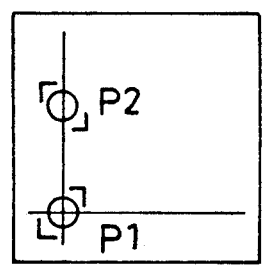
Figure 7D:
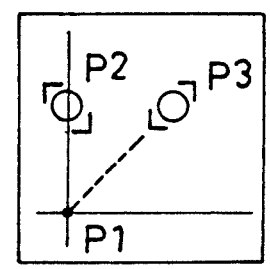
Figure 7E:
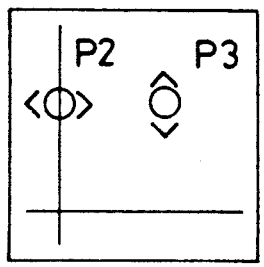
Figure 7F:
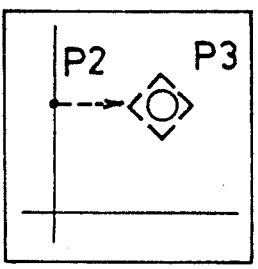
Figure 8:
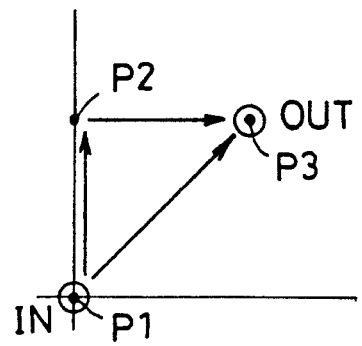
FIG. 8 is a view showing the positional relations between the light components, and sequence of variations thereof occurring in the forward direction through the second example.
Figure 9:
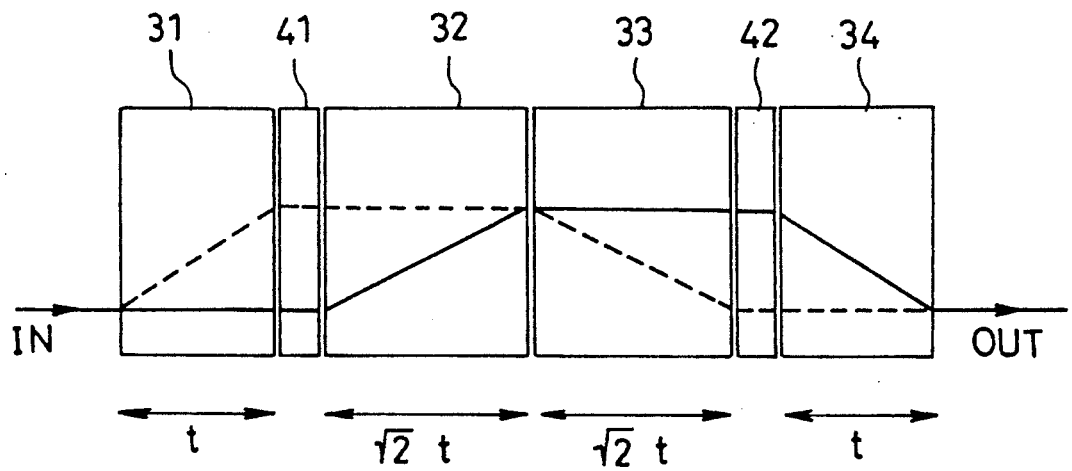
FIG. 9 is a schematic side view of a first embodiment of this invention.
Figure 10A:
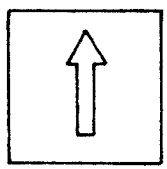
FIGS. 10A through 10D are views showing orientations of optic axes of rutile plates in the first embodiment, respectively.
Figure 10B:
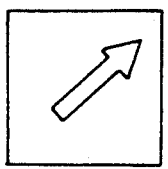
Figure 10C:
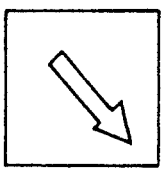
Figure 10D:
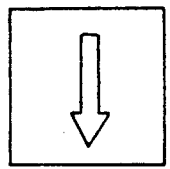

Referring to FIG. 9, an optical isolator employs rutile ($TiO_2$) as birefringent crystals, and includes four rutile plates 31, 32, 33 and 34 and two Faraday elements 41 and 42. These components are arranged in series along an optical axis in the order of rutile plate 31, Faraday element 41, rutile plate 32, rutile plate 33, Faraday element 42 and rutile plate 34. The rutile plates 31, 32, 33 and 34 have optic axes oriented as shown by arrows in FIGS. 10A through 10D when seen from a light incident end, respectively. That is, the rutile plate 32 has an optic axis extending in a direction rotated 45° clockwise from the optic axis of the rutile plate 31. The rutile plate 33 has an optic axis extending in a direction rotated 135° clockwise from the optic axis of the rutile plate 31. The rutile plate 34 has an optic axis extending in a direction rotated 180° clockwise from the optic axis of the rutile plate 31. The rutile plates 31, 32, 33 and 34 have thicknesses t, $\sqrt{2}t$, $\sqrt{2}t$ and t, respectively.

Figure 11A:
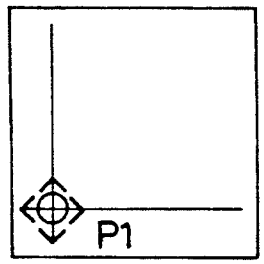
FIGS. 11A through 11G are schematic views showing planes of polarization of and positional relations between polarized light components seen in a forward direction through the first embodiment.
Figure 11B:
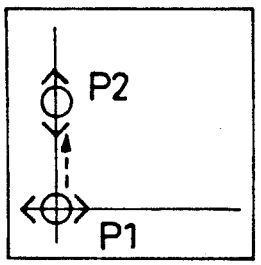

Assume that light enters the first rutile plate 31 at a position P1 shown in FIG. 11A. A component of the incident light having a vertical plane of polarization is refracted as an extraordinary light component, while a component having a horizontal plane of polarization travels straight through as an ordinary light component without being refracted. As a result, the two components of the light entering at position P1 exit at separate positions P1 and P2 on an exit end surface as shown in FIG. 11B. The angle of separation between the positions P1 and P2 are at its maximum, i.e. about 5.8°, when the optic axis and plate surface form an angle of 42°. The distance between positions P1 and P2 is proportional to the thickness t, and the factor of proportionality is a tangent of the above angle. That is, the distance is $t \cdot \tan 5.8°$.

Figure 11C:
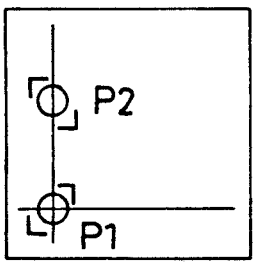
Figure 11D:
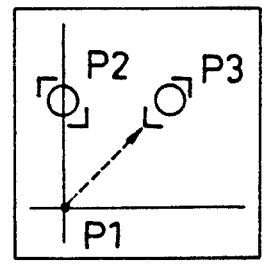

The two polarized light components exiting separately have the respective planes of polarization rotated 45° in the Faraday element 41. Since the positional relationship between the two light components does not change, the two light components entering the rutile plate 32 have planes of polarization and incident positions as shown in FIG. 11C. The rutile plate 32 has the optic axis as shown by the arrow in FIG. 10B, and the thickness $\sqrt{2}t$. Of the light components entering the rutile plate 32, the component entering at position P1 is refracted as an extraordinary light component as in the first rutile plate 31. As a result of the refraction, the component entering at position P1 exits at position P3 as shown in FIG. 11D. Position P3 is located 45° upward and rightward from position P1, and the distance therebetween is proportional to $\sqrt{2}t$. The light component entering at the other position P2 is an ordinary light component which passes straight through the rutile plate 32 without being refracted, and exits at position P2. It is to be noted that the rutile plates 31, 32, 33 and 34 all have the optic axes and plate surfaces forming the same angle, i.e. have the same angle of separation.

Figure 11E:
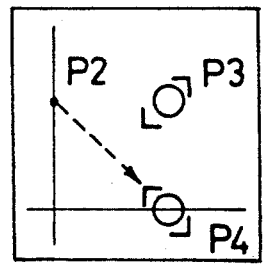

The two polarized light components exiting the rutile plate 32 enter the rutile plate 33. This rutile plate 35 have the optic axis as shown by the arrow in FIG. 10C, and the thickness $\sqrt{2}t$. Of the light components entering the rutile plate 33, the component entering at position P2 is refracted as an extraordinary light component and exits at position P4 as shown in FIG. 11E. Position P4 is located 45° rightward and downward from position P2, and the distance therebetween is proportional to $\sqrt{2}t$. The component entering at position P3 is an ordinary light component which passes straight through the rutile plate 33 without being refracted, and exits at position P3.

Figure 11F:
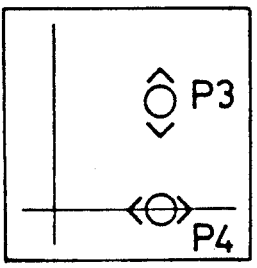
Figure 11G:
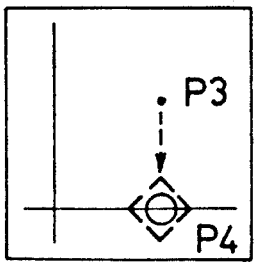

The two light components exiting the rutile plate 33 travels through the Faraday element 42 where the respective planes of polarization are rotated 45°, and enter the next rutile plate 34. The two light components entering the rutile plate 34 have positions and planes of polarization as shown in FIG. 11F. This rutile plate 34 has the optic axis extending as shown by the arrow in FIG. 10D, and the light component entering at position P3 is refracted downward as an extraordinary light component. The angle of refraction is the same as in the other rutile plates 31, 32 and 33. The displacement due to the refraction is proportional to the thickness of the rutile plate. Since this rutile plate 34 have the thickness t, the displacement occurs through a distance proportional to t. Consequently, the two polarized light components coincide at exit position P3 (FIG. 11G).

Figure 12:
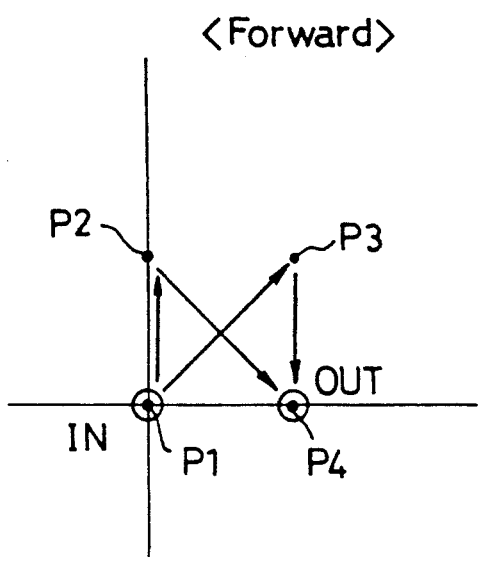
FIG. 12 is a view showing the positional relations between the light components, and sequence of variations thereof occurring in the forward direction through the first embodiment.

The above phenomenon will be described further with reference to FIG. 12. FIG. 12 shows the incident and exit points seen from the end of light incidence. The light component refracted upward by the first rutile plate 31 moves from position P1 to position P2. Subsequently, this light component is refracted 45° rightward and downward by the rutile plate 33 to move to position P4. The distance between positions P1 and P2 is proportional to the thickness t, while the distance between positions P2 and P4 is proportional to the thickness $\sqrt{2}$t. On the other hand, the light component traveling straight through the rutile plate 31 is refracted 45° upward and rightward by the rutile plate 32, and the amount of displacement (i.e. distance between positions P1 and P3) is proportional to the thickness $\sqrt{2}$t. This light component is refracted downward by the rutile plate 34, and the amount of displacement (i.e. distance between positions P3 and P4) is proportional to the thickness t. The factor of proportionality is the same in all the cases, which is tan$\theta$ ($\theta$ being an angle of separation, e.g. 5.8°). As a result, the two polarized light components exit at the same position P4. The total amount of displacements from position P1 to position P2 and then to position P4 is equal to that from position P1 to position P3 and then to position P4.

The fact that the respective light components become displaced in the same amount in directions at right angles to the optical axis means that both light components travel through an equal optical path length. This is because the length in a direction parallel to the optical axis, i.e. the total thickness of the rutile plates, is the same for the refracted light (extraordinary light) and non-refracted light (ordinary light).

Where the extraordinary light and ordinary light have optical path lengths Ne and No through the rutile plates 32 and 33 having the thickness $\sqrt{2}$t, and optical path lengths Ne' and No' through the rutile plates 31 and 34 having the thickness t, respectively, the total path length of the light component moving from position P1 through position P2 to position P4 is;

$$Ne' + No + Ne + No'$$

and that of the light component moving from position P1 through position P3 to position P4 is;

$$No' + Ne + No + Ne'.$$

Thus, the two light components travel through an equal optical path length.

Figure 13:
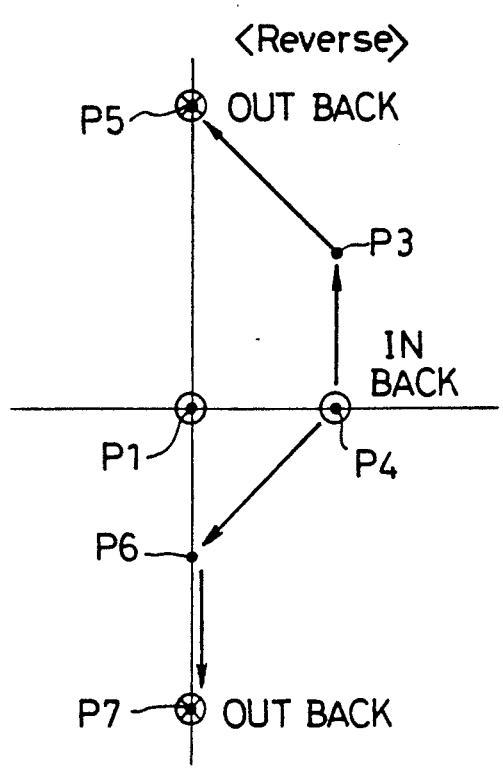
FIG. 13 is a view showing the positional relations between the light components, and sequence of variations thereof occurring in a reverse direction through the first embodiment.

When light travels in the reverse direction from right to left instead of traveling in the forward direction from left to right, the two polarized light components exit at separate positions which are also different from the position of incidence of the light traveling in the forward direction. Of light entering in the reverse direction at the exit position P4 of forward traveling, as shown in FIG. 13, a light component having a vertical plane of polarization shifts to position P3 in the rutile plate 34 and to position P5 in this rutile plate 32, and exits at this position P5. A light component having a horizontal plane of polarization shifts to position P6 in the rutile plate 33 and to position P7 in the rutile plate 31, and exits at this position P7. These exit positions P5 and P7 are different from each other, and are far from the incidence position P1 of the light traveling forward. Thus, isolation characteristics are obtained which cause no loss of the light traveling in the forward direction but a great loss of the light traveling in the reverse direction.

Second Embodiment

Figure 14:
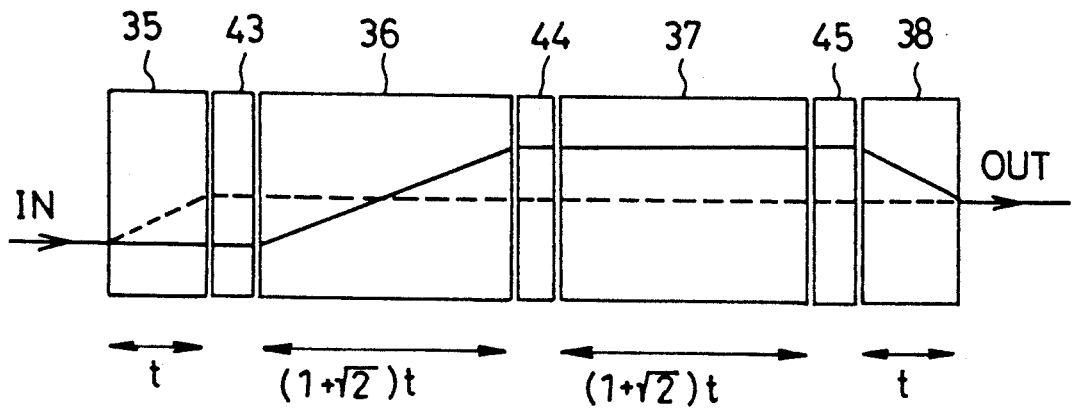
FIG. 14 is a schematic side view of a second embodiment of this invention.
Figure 15A:
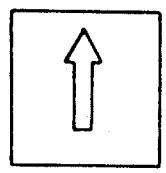
FIGS. 15A through 15D are views showing orientations of optic axes of rutile plates in the second embodiment, respectively.
Figure 15B:
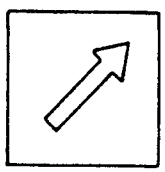
Figure 15C:
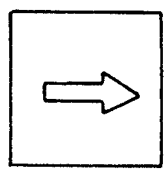
Figure 15D:
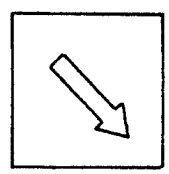

A second embodiment of this invention will be described in detail hereinafter with reference to the drawings. Referring to FIG. 14, an optical isolator employs rutile (TiO$_2$) as birefringent crystals, and includes four rutile plates 35, 36, 37 and 38 and three Faraday elements 43, 44 and 45. These components are arranged in series along an optical axis in the order of rutile plate 35, Faraday element 43, rutile plate 36, Faraday element 44, rutile plate 37, Faraday element 45 and rutile plate 38. The rutile plates 35, 36, 37 and 38 have optic axes oriented as shown by arrows in FIGS. 15A through 15D when seen from a light incident end, respectively. That is, the rutile plate 36 has an optic axis extending in a direction rotated 45° clockwise from the optic axis of the rutile plate 35. The rutile plate 37 has an optic axis extending in a direction rotated 90° clockwise from the optic axis of the rutile plate 35. The rutile plate 38 has an optic axis extending in a direction rotated 135° clockwise from the optic axis of the rutile plate 35. The rutile plates 35, 36, 37 and 38 have thicknesses t, (1+$\sqrt{2}$)t, (1+$\sqrt{2}$)t and t, respectively.

Figure 16A:
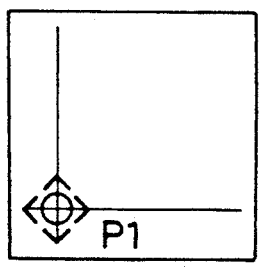
FIGS. 16A through 16H are schematic views showing planes of polarization of and positional relations between polarized light components seen in a forward direction through the second embodiment.
Figure 16B:
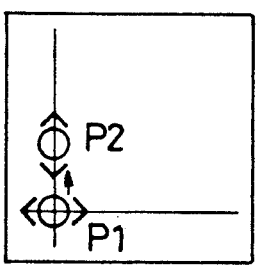

Assume that light enters the first rutile plate 35 at a position P1 shown in FIG. 16A. A component of the incident light having a vertical plane of polarization is refracted as an extraordinary light component, while a component having a horizontal plane of polarization travels straight through as an ordinary light component without being refracted. As a result, the two components of the light entering at position P1 exit at separate positions P1 and P2 on an exit end surface as shown in FIG. 16B. The angle of separation between the positions P1 and P2 are at its maximum, i.e. about 5.8°, when the C axis and plate surface form an angle of 42°. The distance between positions P1 and P2 is proportional to the thickness t, and the factor of proportionality is a tangent of the above angle. That is, the distance is t·tan5.8°.

Figure 16C:
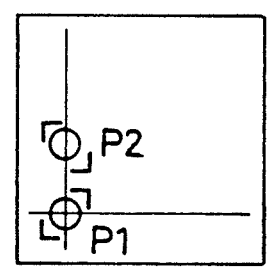
Figure 16D:
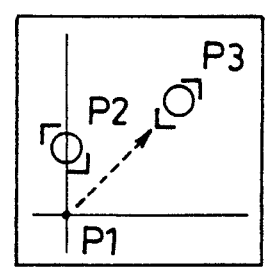

The two polarized light components exiting separately have the respective planes of polarization rotated 45° in the Faraday element 43. Since the positional relationship between the two light components does not change, the two light components entering the rutile plate 36 have planes of polarization and incident positions as shown in FIG. 16C. The rutile plate 36 has the optic axis as shown by the arrow in FIG. 15B, and the thickness (1+$\sqrt{2}$)t. Of the light components entering the rutile plate 36, the component entering at position P1 is refracted as an extraordinary light component as in the first rutile plate 35. As a result of the refraction, the component entering at position P1 exits at position P3 as shown in FIG. 16D. Position P3 is located 45° upward and rightward from position P1, and the distance therebetween is proportional to (1+$\sqrt{2}$)t. The light component entering at the other position P2 is an ordinary light component which passes straight through the rutile plate 36 without being refracted, and exits at position P2. It is to be noted that the rutile plates 35, 36, 37 and 38 all have the optic axes and plate surfaces forming the same angle, i.e. have the same angle of separation.

Figure 16E:
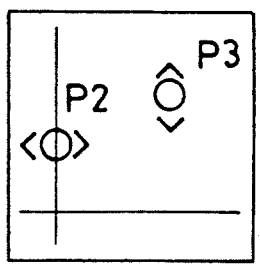

The two polarized light components exiting the rutile plate 36 enters the Faraday element 44 where the respective planes of polarization are rotated 45°. The positional relationship between the two light components does not change, and the two light components exit the Faraday element 4 as shown in FIG. 16E.

Figure 16F:
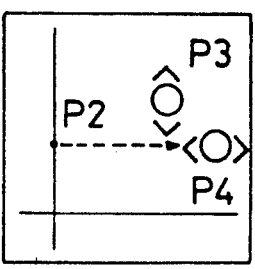

The light components exiting the Faraday element 44 enter the rutile plate 37. This rutile plate 37 have the optic axis as shown by the arrow in FIG. 15C, and the thickness $(1+\sqrt{2})t$. Of the light components entering the rutile plate 37, the component entering at position P2 is refracted as an extraordinary light component and exits at position P4 as shown in FIG. 16F. Position P4 is located rightward from position P2, and the distance therebetween is proportional to $(1+\sqrt{2})t$. The component entering at position P3 is an ordinary light component which passes straight through the rutile plate 37 without being refracted, and exits at position P3.

Figure 16G:
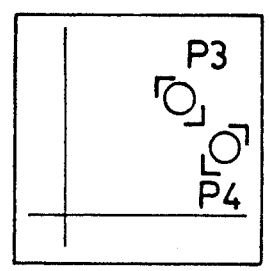
Figure 16H:
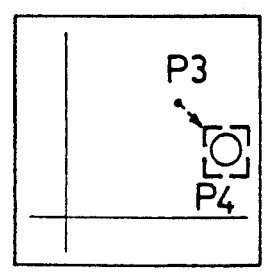

The two light components exiting the rutile plate 37 travels through the Faraday element 45 where the respective planes of polarization are rotated 45°, and enter the next rutile plate 38. The light components entering the rutile plate 38 have positions and planes of polarization as shown in FIG. 16G. This rutile plate 38 has the optic axis extending as shown by the arrow in FIG. 15D, and the light component entering at position P3 is refracted rightward and downward as an extraordinary light component. The angle of refraction is the same as in the other rutile plates 35, 36 and 37. The displacement due to the refraction is proportional to the thickness of the rutile plate. Since this rutile plate 38 has the thickness t, the displacement occurs through a distance proportional to t. Consequently, the two polarized light components coincide at exit position P4 (FIG. 16H).

Figure 17:
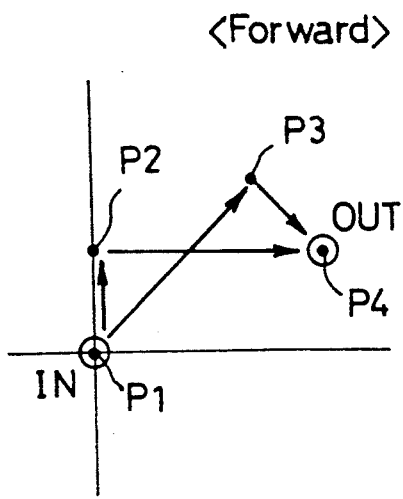
FIG. 17 is a view showing the positional relations between the light components, and sequence of variations thereof occurring in the forward direction through the second embodiment.

The above phenomenon will be described further with reference to FIG. 17. FIG. 17 shows the incident and exit points seen from the end of light incidence. The light component refracted upward by the first rutile plate 35 moves from position P1 to position P2. Subsequently, this light component is refracted rightward by the rutile plate 37 to move to position P4. The distance between positions P1 and P2 is proportional to the thickness t, while the distance between positions P2 and P4 is proportional to the thickness $(1+\sqrt{2})t$. On the other hand, the light component traveling straight through the rutile plate 35 is refracted 45° upward and rightward by the rutile plate 36, and the amount of displacement (i.e. distance between positions P1 and P3) is proportional to the thickness $(1+\sqrt{2})t$. This light component is refracted rightward and downward by the rutile plate 38, and the amount of displacement (i.e. distance between positions P3 and P4) is proportional to the thickness t. The factor of proportionality is the same in all the cases, which is $\tan\theta$ ($\theta$ being an angle of separation, e.g. 5.8°). As a result, the two polarized light components exit at the same position P4. The total amount of displacements from position P1 to position P2 and then to position P4 is equal to that from position P1 to position P3 and then to position P4.

As noted in the first embodiment, the fact that the respective light components become displaced in the same amount in directions at right angles to the optical axis means that both light components travel through an equal optical path length.

Figure 18:
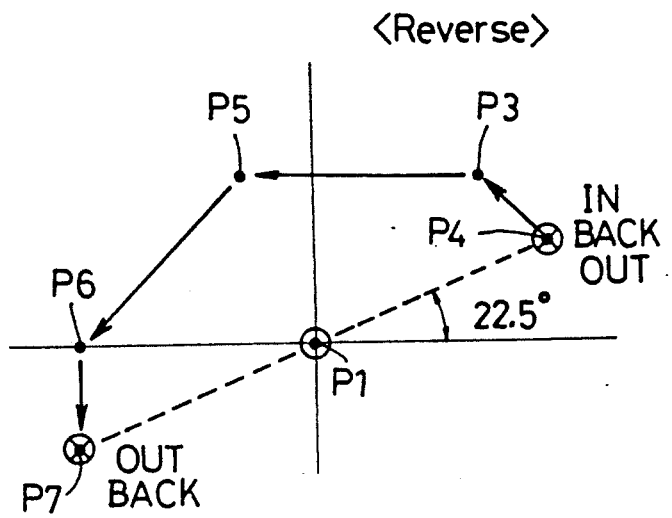
FIG. 18 is a view showing the positional relations between the light components, and sequence of variations thereof occurring in a reverse direction through the second embodiment.

When light travels in the reverse direction from right to left instead of traveling in the forward direction from left to right, the two polarized light components exit at separate positions which are also different from the position of incidence of the light traveling in the forward direction. Of light entering in the reverse direction at the exit position P4 of forward traveling, as shown in FIG. 18, a light component having a plane of polarization inclined 45° clockwise shifts to position P3 in the rutile plate 38, to position P5 in the rutile plate 37, to position P6 in the rutile plate 36 and to position P7 in the rutile plate 35, and exits at this position P7. A light component having a plane of polarization inclined 45° counterclockwise is an ordinary light in all of the rutile plates 35, 36, 37 and 38 and is therefore not refracted. Thus, this light component does not shift from the incidence position P4 but exits at this position P4. These exit positions P4 and P7 are different from each other, and are far from the incidence position P1 of the light traveling forward. Thus, isolation characteristics are obtained which cause no loss of the light traveling in the forward direction but a great loss of the light traveling in the reverse direction.

In the optical isolators described in the first and second embodiments, the Faraday elements may have varied thicknesses to provide slightly differentiated wavelengths with the respective planes of polarization rotated 45°. Then, each of the plural-stage isolators (the two-stage isolator in the first embodiment, and the three-stage isolator in the second embodiment) may be operable over a wide wavelength range.

Further, while rutile is used as the birefringent crystals in the foregoing embodiments, sapphire, calcite or other birefringent crystals may be used instead.

The present invention may be embodied in other specific forms without departing from the spirit or essential attributes thereof and, accordingly, reference should be made to the appended claims, rather than to the foregoing specification, as indicating the scope of the invention.

What is claimed is:

1. An optical isolator having a combination of birefringent crystals and Faraday elements, said optical isolator comprising, arranged along an optical axis:
   a first birefringent crystal;
   a first Faraday element for rotating a plane of polarization 45 degrees;
   a second birefringent crystal having an optic axis rotated 45 degrees with respect to said first birefringent crystal, and a thickness $\sqrt{2}$ times a thickness of said first birefringent crystal;
   a third birefringent crystal having an optic axis rotated 135 degrees with respect to said first birefringent crystal, and a thickness $\sqrt{2}$ times the thickness of said first birefringent crystal;
   a second Faraday element for rotating the plane of polarization 45 degrees; and
   a fourth birefringent crystal having an optic axis rotated 180 degrees with respect to said first birefringent crystal, and a thickness equal to the thickness of said first birefringent crystal.

2. An optical isolator as defined in claim 1, wherein said birefringent crystals are rutile.

3. An optical isolator as defined in claim 1, wherein said birefringent crystals are sapphire.

4. An optical isolator as defined in claim 1, wherein said birefringent crystals ar calcite.

5. An optical isolator having a combination of birefringent crystals and Faraday elements, said optical isolator comprising, arranged along an optical axis:
   a first birefringent crystal;
   a first Faraday element for rotating a plane of polarization 45 degrees;
   a second birefringent crystal having an optic axis rotated 45 degrees with respect to said first birefringent crystal, and a thickness $(1+\sqrt{2})$ times a thickness of said first birefringent crystal;

a second Faraday element for rotating the plane of polarization 45 degrees;

a third birefringent crystal having an optic axis rotated 90 degrees with respect to said first birefringent crystal, and a thickness $(1+\sqrt{2})$ times the thickness of said first birefringent crystal;

a third Faraday element for rotating the plane of polarization 45 degrees; and a fourth birefringent crystal having an optic axis rotated 135 degrees with respect to said first birefringent crystal, and a thickness equal to the thickness of said first birefringent crystal.

6. An optical isolator as defined in claim 5 wherein said birefringent crystals are rutile.

7. An optical isolator as defined in claim 5, wherein said birefringent crystals are sapphire.

8. An optical isolator as defined in claim 5, wherein said birefringent crystals are calcite.

* * * * *